(12) United States Patent
Ferguson

(10) Patent No.: US 11,891,072 B2
(45) Date of Patent: *Feb. 6, 2024

(54) CONTEXT-BASED GRADING

(71) Applicant: Allstate Insurance Company, Northbrook, IL (US)

(72) Inventor: Dana Ferguson, Chicago, IL (US)

(73) Assignee: Allstate Insurance Company, Northbrook, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/166,220

(22) Filed: Feb. 8, 2023

(65) Prior Publication Data

US 2023/0294709 A1    Sep. 21, 2023

Related U.S. Application Data

(63) Continuation of application No. 17/583,904, filed on Jan. 25, 2022, now Pat. No. 11,603,105, which is a continuation of application No. 16/847,709, filed on Apr. 14, 2020, now Pat. No. 11,260,873, which is a continuation of application No. 16/014,417, filed on Jun. 21, 2018, now Pat. No. 10,633,002, which is a continuation of application No. 15/081,135, filed on Mar. 25, 2016, now Pat. No. 10,029,696.

(51) Int. Cl.
*B60W 40/09* (2012.01)
*B60W 50/14* (2020.01)

(52) U.S. Cl.
CPC ............ *B60W 40/09* (2013.01); *B60W 50/14* (2013.01); *B60W 2050/146* (2013.01); *B60W 2556/50* (2020.02)

(58) Field of Classification Search
CPC ................ B60W 40/09; B60W 50/14; B60W 2050/146; B60W 2556/50
See application file for complete search history.

(56) References Cited

U.S. PATENT DOCUMENTS

| 9,147,353 | B1 | 9/2015 | Slusar | |
|---|---|---|---|---|
| 2016/0167652 | A1* | 6/2016 | Slusar | B60W 30/143 701/27 |
| 2016/0288797 | A1 | 10/2016 | Takahashi et al. | |

OTHER PUBLICATIONS

U.S. Appl. No. 17/583,904, filed Jan. 25, 2022, Dana Ferguson.
U.S. Appl. No. 16/847,709, filed Apr. 14, 2020, Dana Ferguson.
U.S. Appl. No. 16/014,417, filed Jun. 21, 2018, Dana Ferguson.
U.S. Appl. No. 15/081,135, filed Mar. 25, 2016, Dana Ferguson.

(Continued)

*Primary Examiner* — Yuen Wong
(74) *Attorney, Agent, or Firm* — Dinsmore & Shohl LLP

(57) ABSTRACT

A driving analysis server may be configured to receive vehicle operation data from mobile devices respectively disposed within the vehicles, and may use the data to group the vehicles into multiple groups. A driving pattern for each vehicle may be established and compared against a group driving pattern of its corresponding group to identify outliers. A driver score the outliers may be adjusted positively or negatively based on whether the outlier behaved in a manner more or less safe than its group. Further, unsafe driving events performed by the outlier that were the result of another vehicle's unsafe driving event may be ignored or positively accounted for in determining or adjusting the outlier's driver score.

20 Claims, 7 Drawing Sheets

(56) References Cited

OTHER PUBLICATIONS

May 16, 2017—U.S. Non-Final Office Action—U.S. Appl. No. 15/081,135.
Oct. 18, 2017—U.S. Final Office Action—U.S. Appl. No. 15/081,135 (006591.00989).
Mar. 27, 2018—U.S. Notice of Allowance—U.S. Appl. No. 15/081,135 (006591.00989).
Dec. 18, 2019—U.S. Notice of Allowance—U.S. Appl. No. 16/014,417 (6591.1818).

* cited by examiner

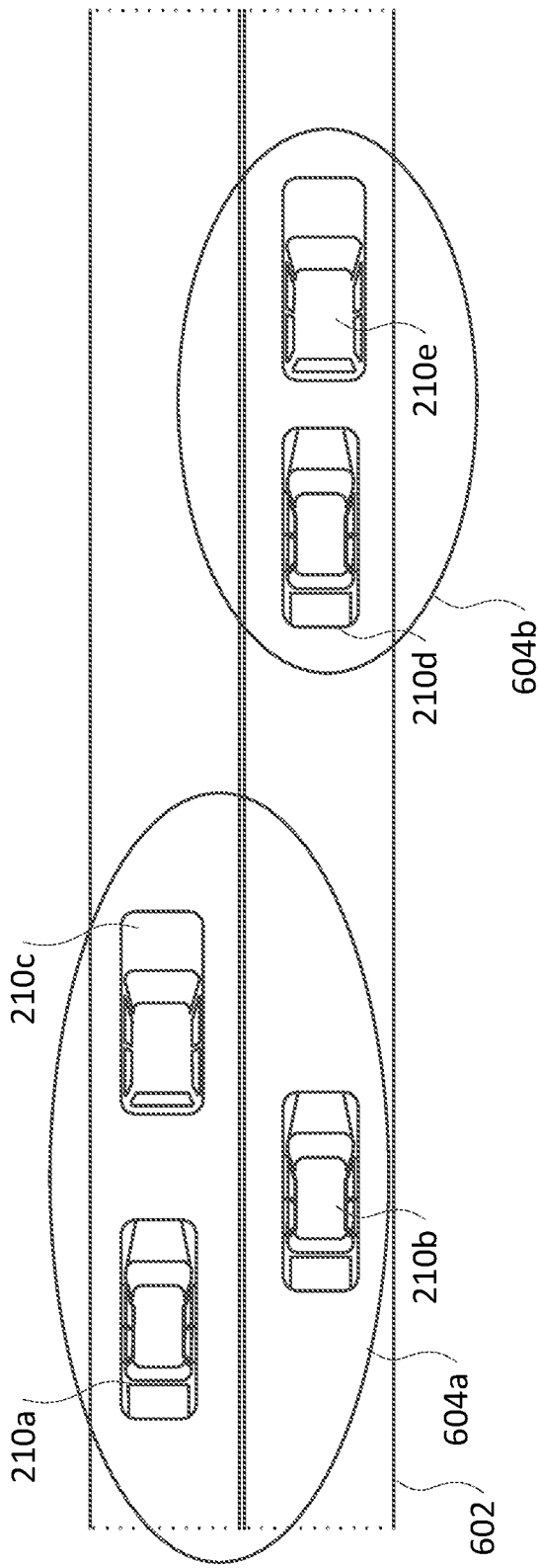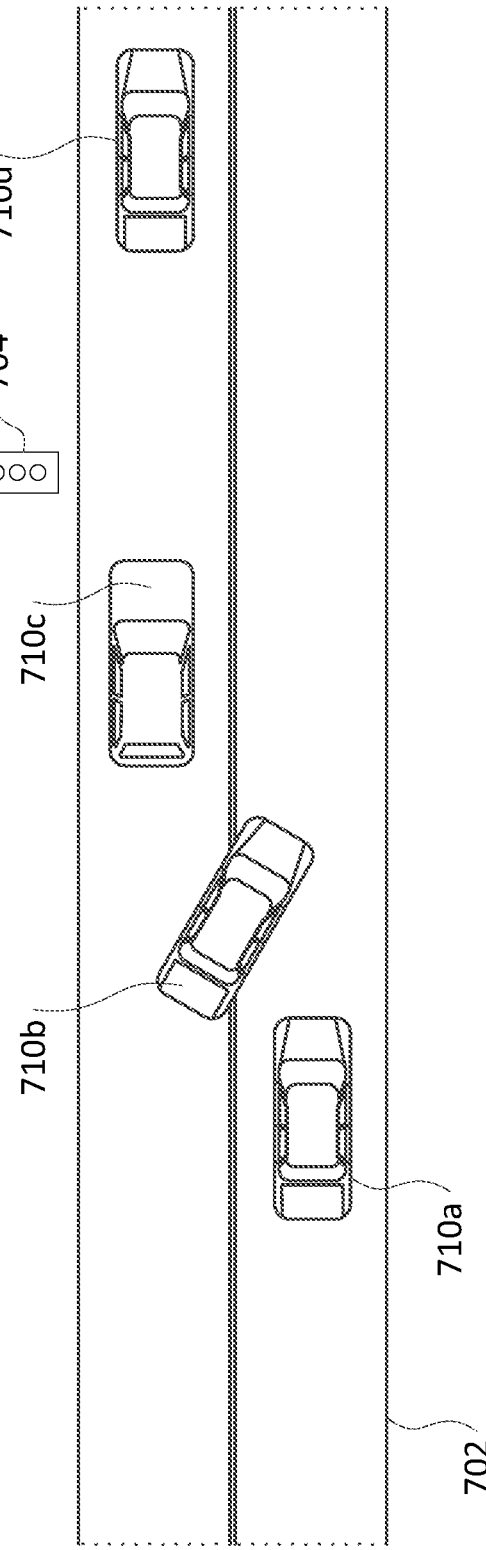
FIG. 6
FIG. 7

CONTEXT-BASED GRADING

CROSS-REFERENCE TO RELATED APPLICATION

This application is a continuation of U.S. patent application Ser. No. 17/583,904, filed Jan. 25, 2022, which is a continuation of U.S. patent application Ser. No. 16/847,709, filed Apr. 14, 2020, now issued as U.S. Pat. No. 11,260,873, which is a continuation of U.S. patent application Ser. No. 16/014,417, filed Jun. 21, 2018, now issued as U.S. Pat. No. 10,633,022, which is a continuation U.S. patent application Ser. No. 15/081,135, filed Mar. 25, 2016, now issued as U.S. Pat. No. 10,029,696, which are incorporated herein by reference in their entirety.

TECHNICAL FIELD

Aspects of the disclosure generally relate to a framework for adjusting driver scores for vehicles that have a driving pattern substantially different from a driving pattern of a group of vehicles while also accounting for less safe driving behavior associated with vehicles of the group.

BACKGROUND

The collection and analysis of driving data, such as the identification of driving behaviors and traffic accidents, has many applications. For example, insurance companies and financial institutions may offer rate discounts or other financial incentives to customers based on safe driving behaviors and accident-free driving records. Law enforcement or government personnel may collect and analyze driving data and traffic accident statistics to identify dangerous driving roads or times, and to detect moving violations and other unsafe driving behaviors. In other cases, driving data may be used for navigation applications, vehicle tracking and monitoring applications, and on-board vehicle maintenance applications, among others.

Vehicle-based computer systems, such as on-board diagnostics (OBD) systems and telematics devices, may be used in automobiles and other vehicles, and may be capable of collecting various driving data and vehicle sensor data. For example, OBD systems may receive information from the vehicle's on-board computers and sensors in order to monitor a wide variety of information relating to the vehicle systems, such as engine RPM, emissions control, vehicle speed, throttle position, acceleration and braking rates, use of driver controls, etc. Vehicles may also include Global Positioning System (GPS) receivers and devices installed within or operating at the vehicle configured to collect vehicle location and time data. Such vehicle-based systems may be capable of collecting driving data which may be used to perform various driving data analyses such as statistical driving evaluations, driver score calculations, etc. Vehicle-based systems also may be configured to detect the occurrence of traffic accidents, for instance, using vehicle body impact sensors and airbag deployment sensors. However, not all vehicles are equipped with systems capable of collecting, analyzing, and communicating driving data. Moreover, a single vehicle may be used by multiple different drivers, and conversely, a single driver may drive multiple different vehicles. Thus, vehicle driving data and/or accident records collected by vehicle-based systems might not include the vehicle occupants that correspond to the collected driving and accident data.

In contrast to vehicle-based systems, mobile devices such as smartphones, personal digital assistants, tablet computers, and the like, are often carried and/or operated by a single user. Some mobile devices may include movement sensors, such as an accelerometer, gyroscope, speedometer, and/or GPS receivers, capable of detecting movement.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, and apparatuses for receiving telematics data (e.g., vehicle operation data, driver data, environmental data, etc.) associated with one or more vehicles from one or more mobile devices respectively disposed within the one or more vehicles. Telematics data may include, for example, a geographic location of the vehicle, a route being traversed by the vehicle, driving events or maneuvers (e.g., braking, turning, accelerating) performed by the vehicle, corresponding timestamps or timeframes, etc. In some instances, the telematics data may include sensor data from various sensors operationally coupled to the vehicle and configured to sense the immediate surroundings of the vehicle. A computing device may group the vehicles based on their telematics data. For instance, vehicles may be grouped based on route traversed, geographic proximity with one another, etc. The computing device may also use telematics data to determine driving patterns representative of driving behaviors of each vehicle as well as group driving patterns representative of the normalized driving behavior for a group of vehicles. One or more outlier vehicles for each group may be identified based on the outlier vehicles' driving pattern being different from its group's group driving pattern beyond a dissimilarity metric threshold (or a similarity metric threshold). A driver score of the outlier vehicle may be positively or negatively adjusted based on whether the outlier was safer or less safe than its group. A measure of safety for a vehicle may be a number of unsafe events (e.g., hard-braking, swerving, excessive speeding, etc.) determined from a vehicle's telematics data for a particular time period. A measure of safety for a group of vehicles may be an average number of unsafe events determined from the telematics data of the vehicles in the group for the particular time period.

In accordance with further aspects of the present disclosure, contextual data (e.g., extenuating circumstances) may be considered in determining a driver score. For instance, a high-risk or unsafe driving event performed by a vehicle and identified from the vehicle's telematics data may generally result in a negative adjustment to the driver's score. However, if the driver performed the high-risk or unsafe driving event to avoid an accident with another vehicle that is behaving badly (e.g., performing a high-risk or unsafe driving event), the driver's score might not be negatively adjusted. Rather, the driver score may be maintained or positively adjusted. As an example, a driver who performs a hard-braking event as a result of going too fast on a curve may result in a negative adjustment to the driver's score. However, a driver who performs a hard-braking event to avoid a collision with another vehicle that is swerving and cutting off the driver's vehicle might not result in a negative adjustment to the driver's score. In some instances, such a driver may receive a positive adjustment to his or her driving score.

In accordance with further aspects of the present disclosure, a computing device may determine whether a vehicle that was not involved in a collision or accident determination but nonetheless caused the collision or accident.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIGS. 6 and 7 depict an illustrative top view of multiple vehicles traversing a street or road, according to one or more aspects of the disclosure.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
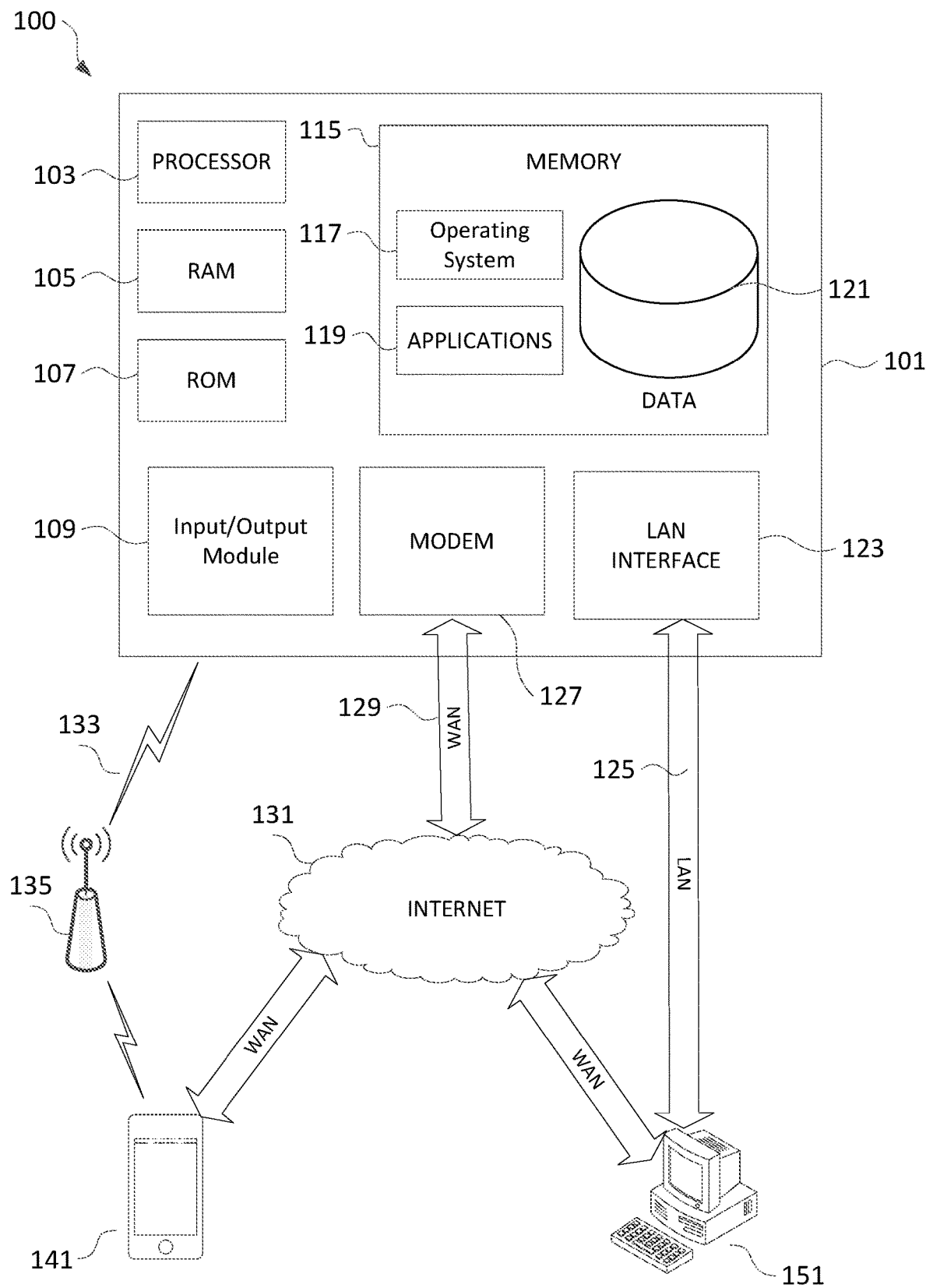
FIG. 1 depicts an illustrative network environment and computing systems that may be used to implement aspects of the disclosure.

FIG. 1 illustrates a block diagram of a computing device (or system) 101 in communication system 100 that may be used according to one or more illustrative embodiments of the disclosure. The device 101 may have a processor 103 for controlling overall operation of the device 101 and its associated components, including RAM 105, ROM 107, input/output module 109, and memory 115. The computing device 101, along with one or more additional devices (e.g., terminals 141, 151) may correspond to any of multiple systems or devices, such as a driving analysis server or system, configured as described herein for receiving and analyzing vehicle driving data and calculating driver scores based on identified driving events.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various functions. For example, memory 115 may store software used by the device 101, such as an operating system 117, application programs 119, and an associated internal database 121. Processor 103 and its associated components may allow the driving analysis system 101 to execute a series of computer-readable instructions to receive driving data from a vehicle, identify a driving event based on the driving data, receive image data, video data, and/or object proximity data associated with the driving event, and perform an analysis of the driving event based on image data, video data, and/or object proximity data.

The driving analysis system 101 may operate in a networked environment 100 supporting connections to one or more remote computers, such as terminals 141 and 151. The terminals 141 and 151 may be personal computers, servers (e.g., web servers, database servers), or mobile communication devices (e.g., vehicle telematics devices, on-board vehicle computers, mobile phones, portable computing devices, and the like), and may include some or all of the elements described above with respect to the driving analysis system 101. The network connections depicted in FIG. 1 include a local area network (LAN) 125 and a wide area network (WAN) 129, and a wireless telecommunications network 133, but may also include other networks. When used in a LAN networking environment, the driving analysis system 101 may be connected to the LAN 125 through a network interface or adapter 123. When used in a WAN networking environment, the system 101 may include a modem 127 or other means for establishing communications over the WAN 129, such as network 131 (e.g., the Internet). When used in a wireless telecommunications network 133, the system 101 may include one or more transceivers, digital signal processors, and additional circuitry and software for communicating with wireless computing devices 141 (e.g., mobile phones, vehicle telematics devices) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and driving analysis system components described herein may be configured to communicate using any of these network protocols or technologies.

Additionally, one or more application programs 119 used by the driving analysis server/system 101 may include computer executable instructions (e.g., driving analysis programs, pattern identification and analysis algorithms, and driver score algorithms) for receiving vehicle driving data, identifying driving events, retrieving additional image data, video data, and/or object proximity data associated with the driving events, analyzing the driving events and the additional associated data, performing driving data analyses or driver score computations for one or more vehicles or drivers, and performing other related functions as described herein.

As used herein, a driver score (or driving score) may refer to a measurement of driving abilities, safe driving habits, and other driver information. A driver score may be a rating generated by an insurance provider, financial instruction, or other organization, based on the driver's age, vision, medical history, driving record, and/or other account data relating to the driver. For example, an insurance provider server 101 may periodically calculate driver scores for one or more of the insurance provider's customers, and may use the driver scores to perform insurance analyses and determinations (e.g., determine coverage, calculate premiums and deductibles, award safe driver discounts, etc.). As discussed herein, the driver score may be increased or decreased based on real-time data collected by vehicle sensors, telematics devices, and other systems for measuring driving performance. For example, if a driver consistently drives within posted speed limits, wears a seatbelt, and keeps the vehicle in good repair, the driver score may be positively adjusted (e.g., increased). Alternatively, if a driver regularly speeds, drives aggressively, and does not properly maintain the vehicle, the driver score may be negatively adjusted (e.g., decreased). It should be understood that a driver score, as used herein, may be associated with an individual, group of individuals, or a vehicle. For instance, a family, group of friends or co-workers, or other group that shares a vehicle, may have a single driver score that is shared by the group. Additionally, a vehicle may have an associated driver score that is based on one or more primary drivers of the vehicle and can be affected by the driving behavior of any the vehicle's drivers. In other examples, a vehicle may be configured to identify different drivers, and each driver of the vehicle may have a separate driver score.

Figure 2:
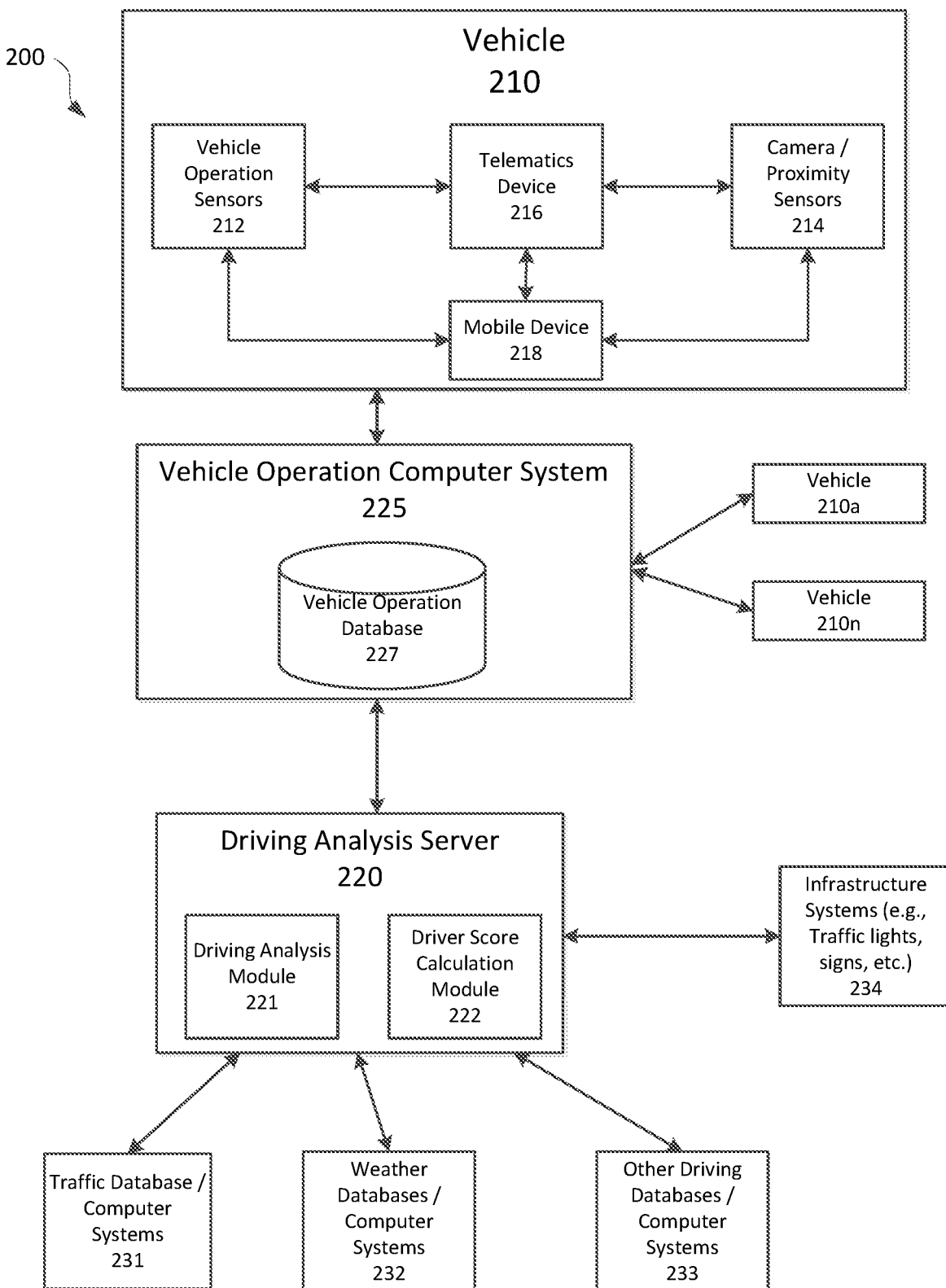
FIG. 2 depicts an illustrative diagram of a driving analysis system, according to one or more aspects of the disclosure.

FIG. 2 is a diagram of an illustrative driving analysis system 200. Each component shown in FIG. 2 may be implemented in hardware, software, or a combination of the two. Additionally, each component of the driving analysis system 200 may include a computing device (or system) having some or all of the structural components described above for computing device 101.

The driving analysis system 200 shown in FIG. 2 includes a vehicle 210, such as an automobile, motorcycle, boat, scooter, or other vehicle for which a driving event data analysis may be performed and for which a driver score may be calculated. The vehicle 210 may include vehicle operation sensors 212 capable of detecting and recording telematics data (e.g., various conditions at the vehicle and operational parameters of the vehicle). For example, sensors 212 may detect and store data corresponding to the vehicle's speed, distances driven, rates of acceleration or braking, and specific instances of sudden acceleration, braking, and swerving. Sensors 212 also may detect and store data received from the vehicle's 210 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems.

Additional sensors 212 may detect and store the external driving conditions, which may also be referred to herein as telematics data, (for example, external temperature, rain, snow, light levels, and sun position for driver visibility). Sensors 212 also may detect and store telematics data relating to moving violations and the observance of traffic signals and signs by the vehicle 210. Additional sensors 212 may detect and store telematics data relating to the maintenance of the vehicle 210, such as the engine status, oil level, engine coolant temperature, odometer reading, the level of fuel in the fuel tank, engine revolutions per minute (RPMs), and/or tire pressure.

The vehicle 210 also may include one or more cameras and proximity sensors 214 capable of recording additional conditions inside or outside of the vehicle 210, which may also be referred to herein as telematics data. Internal cameras 214 may detect conditions such as the number of the passengers in the vehicle 210, and potential sources of driver distraction within the vehicle (e.g., pets, phone usage, unsecured objects in the vehicle). External cameras and proximity sensors 214 may detect other nearby vehicles, traffic levels, road conditions, traffic obstructions, animals, cyclists, pedestrians, and other conditions that may factor into a driving event data analysis.

The operational sensors 212 and the cameras and proximity sensors 214 may store data within the vehicle 210, and/or may transmit the data to one or more external computer systems (e.g., a vehicle operation computer system 225 and/or a driving analysis server 220). As shown in FIG. 2, the operation sensors 212, and the cameras and proximity sensors 214, may be configured to transmit data to a vehicle operation computer system 225 via a telematics device 216. In other examples, one or more of the operation sensors 212 and/or the cameras and proximity sensors 214 may be configured to transmit data directly without using a telematics device 216. For example, telematics device 216 may be configured to receive and transmit data from operational sensors 212, while one or more cameras and proximity sensors 214 may be configured to directly transmit data to a vehicle operation computer system 225 or a driving analysis server 220 without using the telematics device 216. Thus, telematics device 216 may be optional in certain embodiments where one or more sensors or cameras 212 and 214 within the vehicle 210 may be configured to independently capture, store, and transmit vehicle operation and driving data.

Telematics device 216 may be a computing device containing many or all of the hardware/software components as the computing device 101 depicted in FIG. 1. As discussed above, the telematics device 216 may receive vehicle operation and driving data (e.g., telematics data) from vehicle sensors 212, and proximity sensors and cameras 214, and may transmit the telematics data to one or more external computer systems (e.g., a vehicle operation computer system 225 and/or a driving analysis server 220) over a wireless transmission network. Telematics device 216 also may be configured to detect or determine additional types of telematics data relating to real-time driving and the condition of the vehicle 210. In certain embodiments, the telematics device 216 may contain or may be integral with one or more of the vehicle sensors 212 and proximity sensors and cameras 214 discussed above, and/or with one or more additional sensors discussed below.

Additionally, the telematics device 216 may be configured to collect telematics data regarding the number of passengers and the types of passengers (e.g. adults, children, teenagers, pets, etc.) in the vehicle 210. The telematics device 216 also may be configured to collect telematics data indicating a driver's movements or the condition of a driver. For example, the telematics device 216 may include or communicate with sensors that monitor a driver's movements, such as the driver's eye position and/or head position, etc. Additionally, the telematics device 216 may collect data regarding the physical or mental state of the driver, such as fatigue or intoxication. The condition of the driver may be determined through the movements of the driver or through sensors, for example, sensors that detect the content of alcohol in the air or blood alcohol content of the driver, such as a breathalyzer.

The telematics device 216 also may collect telematics data regarding the driver's route choice, whether the driver follows a given route, and to classify the type of trip (e.g. commute, errand, new route, etc.). In certain embodiments, the telematics device 216 may be configured to communicate with the sensors and/or cameras 212 and 214 to determine when and how often the vehicle 210 stays in a single lane or strays into other lanes. To determine the vehicle's route, lane position, and other data, the telematics device 216 may include or may receive data from a mobile telephone, a Global Positioning System (GPS), locational sensors positioned inside a vehicle, or locational sensors or devices remote from the vehicle 210.

The telematics device 216 also may store the type of the vehicle 210, for example, the make, model, trim (or sub-model), year, and/or engine specifications. The vehicle type may be programmed into the telematics device 216 by a user or customer, determined by accessing a remote computer system, such as an insurance company or financial institution server, or may be determined from the vehicle itself (e.g., by accessing the vehicle's 210 computer systems).

The vehicle 210 also may include a personal mobile device 218 containing a number of software and hardware components. A personal mobile device 218 may be located within a vehicle 210, such as a driver's or passenger's smartphone, tablet computer, or other personal mobile device. As used herein, a mobile device 218 "within" a vehicle 210 refers to a mobile device 218 that is inside of or otherwise secured to a moving vehicle, for instance, mobile devices 218 in the cabins of automobiles, buses, recreational vehicles, mobile devices 218 traveling in open-air vehicles such as motorcycles, scooters, or boats, and mobile devices 218 in the possession of drivers or passengers of vehicles 210. Mobile devices 220 may be, for example, smartphones or other mobile phones, personal digital assistants (PDAs), tablet computers, and the like, and may include some or all of the elements described above with respect to the computing device 101.

A mobile device 218 may be configured to establish communication with vehicle-based devices (e.g., sensors, on-board vehicle computing devices, etc.) and various internal components of vehicle 210 via wireless networks or wired connections (e.g., for docked devices), whereby such mobile devices 218 may have secure access to internal vehicle sensors 212, camera/proximity sensors 214 and other vehicle-based systems. However, in other examples, mobile device 218 might not connect to vehicle-based computing devices and internal components, but may operate independently by communicating with vehicles 210 via standard communication interfaces (e.g., short-range communication systems, telematics devices 216, etc.), indirectly through external networks and servers, or might not communicate at all with vehicles 210.

Mobile devices 218 each may include a network interface, which may include various network interface hardware (e.g., adapters, modems, wireless transceivers, etc.) and software components to enable mobile devices 218 to communicate with external servers (e.g., driving analysis server 220), vehicles 210, and various other external computing devices. One or more specialized software applications, such as a telematics data acquisition application may be stored in the memory of the mobile device 220. Application(s) may be received via network interface from driving analysis server 220, vehicles 210, or other application providers (e.g., public or private application stores). Certain applications might not include user interface screens, while other applications may include user interface screens that support user interaction. Such applications may be configured to run as user-initiated applications or as background applications. The memory of mobile device 218 also may include databases configured to receive and store accident data, vehicle data, driver or passenger data, insurance data, and the like, associated with one or more drivers and/or vehicles. Although this section describes various software application (s) as executing on mobile devices 218, in various other implementations, some or all of the functionality described herein may be implemented within the vehicle 210, via specialized hardware and/or software applications within a vehicle-based system, such as software within a telematics device 216 or a vehicle control computer, etc.

Like the vehicle-based computing devices in vehicles 210, mobile devices 218 also may include various components configured to sense (e.g., generate or acquire) telematics data (e.g., geographic location, heading, route, linear velocity, angular velocity, acceleration, deceleration, driver data, weather data, and/or other telematics data discussed herein) and transmit the telematics data or other relevant data to driving analysis server 220 for determination of outliers and driver scores as discussed in further detail below. For example, using data from movement sensors (e.g., 1-axis, 2-axis, or 3-axis accelerometers, compasses, speedometers, vibration sensors, gyroscopic sensors, etc.) and/or GPS receivers or other location-based services (LBS), an application of mobile device 218 may determine that the mobile device 218 is in a moving vehicle, that a driving trip has started or stopped, and/or that a vehicle accident has occurred. The movement sensors and/or GPS receiver or LBS component of a mobile device 218 may also be used to determine driving speeds, routes, accident force and angle of impact, and other accident characteristics and accident-related data.

The vehicle 210 and the personal mobile device 218 may communicate with each other via wireless networks or wired connections (e.g., for devices physically docked in vehicles), and each may communicate with one or more additional vehicles 210, additional mobile computing devices, and/or a number of external computer servers (e.g., driving analysis server 220) over one or more communication networks (e.g., cellular communication network, WiFi communication network, etc.). The sensor data also may be transmitted from vehicles 210 via a telematics device 216 or other network interface(s) to one or more remote computing devices, such as one or more personal mobile devices 218 and/or external servers (e.g., driving analysis server 220). For example, mobile computing device 218 may transmit telematics data, driver data, vehicle data (e.g., braking, linear acceleration, angular velocity, etc.), directly to driving analysis server 220, and thus may be used in conjunction with or instead of telematics devices 216. Additionally, mobile computing devices 218 (and/or telematics device 216) may be configured to perform the vehicle-to-vehicle (V2V) and vehicle-to-infrastructure (V2I) communications described below, by establishing connections and transmitting/receiving telematics data to and from other nearby vehicles. Thus, mobile computing device 218 (and/or telematics device 216) may be used in conjunction with, or instead of, a short-range communication system, which is described further below. In addition, mobile computing device 218 may be used in conjunction with the vehicle control computers for purposes of vehicle control and diagnostics.

Short-range communication systems may be vehicle-based data transmission systems configured to transmit various (e.g., driving data, vehicle data, insurance data, driver and passenger data, etc.) to other nearby vehicles, and to receive corresponding data from other nearby vehicles. In some examples, communication systems may use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, short-range communication systems need not use DSRC, and may be implemented using other short-range wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces. The V2V transmissions between the short-range communication systems may be sent via DSRC, Bluetooth, satellite, GSM infrared, IEEE 802.11, WiMAX, RFID, and/or any suitable wireless communication media, standards, and protocols. In certain systems, short-range communication systems may include specialized hardware installed in vehicles 210 (e.g., transceivers, antennas, etc.), while in other examples the communication systems may be implemented using existing vehicle hardware components (e.g., radio and satellite equipment, navigation computers) or may be implemented by software running on the mobile devices 218 of drivers and passengers within the vehicles 210.

V2V communications also may include vehicle-to-infrastructure (V2I) communications, such as transmissions from vehicles to non-vehicle receiving devices, for example, toll booths, rail road crossings, and road-side traffic monitoring devices. Certain V2V communication systems may periodically broadcast data from a vehicle 210 to any other vehicle, or other infrastructure device capable of receiving the communication, within the range of the vehicle's transmission capabilities. The range of V2V communications and V2I communications may depend on the wireless communication standards and protocols used, the transmission/reception hardware (e.g., transceivers, power sources, antennas), and other factors. Short-range V2V (and V2I) communications may range from just a few feet to many miles, and different types of telematics data and characteristics may be determined depending on the range of the V2V communications.

Vehicle operation computer system 225 may be a computing device separate from the vehicle 210, containing some or all of the hardware/software components as the computing device 101 depicted in FIG. 1. The vehicle operation computer system 225 may be configured to receive and store the vehicle operation data discussed above from vehicle 210, and similar vehicle operation data from one or more other vehicles 210*a-n*. In the example shown in FIG. 2, the vehicle operation computer system 225 includes a vehicle operation database 227 that may be configured to store the vehicle operation data collected from the vehicle sensors 212, proximity sensors and cameras 214, and telematics devices 216 of a plurality of vehicles. The vehicle operation database 227 may store operational sensor data, proximity sensor data, camera data (e.g., image, audio, and/or video), location data and/or time data for multiple vehicles 210.

Data stored in the vehicle operation database 227 may be organized in any of several different manners. For example, a table in the vehicle operation database 227 may contain all of the vehicle operation data for a specific vehicle 210, similar to a vehicle event log. Other tables in the vehicle operation database 227 may store certain types of data for multiple vehicles. For instance, tables may store specific driving behaviors (e.g., driving speed, acceleration and braking rates, swerving, tailgating, use of seat belts, turn signals or other vehicle controls, etc.) for multiple vehicles 210 at specific locations, such as specific neighborhoods, roads, or intersections. Vehicle operation data may also be organized by time, so that the driving events or behaviors of multiple vehicles 210 may be stored or grouped by time (e.g., morning, afternoon, late night, rush hour, weekends, etc.) as well as location.

The system 200 also may include a driving analysis server 220, containing some or all of the hardware/software components as the computing device 101 depicted in FIG. 1. The driving analysis server 220 may include hardware, software, and network components to receive vehicle operation data from the vehicle operation computer system 225 and/or directly from a plurality of vehicles 210 and/or a plurality of mobile devices respectively disposed within the plurality of vehicles. The driving analysis server 220 and the vehicle operation computer system 225 may be implemented as a single server/system, or may be separate servers/systems. In some examples, the driving analysis server 220 may be a central server configured to receive vehicle operation data from a plurality of remotely located vehicle operation computer systems 225.

As shown in FIG. 2, driving analysis server 220 may include a driving analysis module 221 and a driver score calculation module 222. Modules 221 and 222 may be implemented in hardware and/or software configured to perform a set of specific functions within the driving analysis server 220. For example, the driving analysis module 221 and the driver score calculation module 222 may include one or more driving event analysis/driver score calculation algorithms, driving pattern determination and comparison algorithms, which may be executed by one or more software applications running on generic or specialized hardware within the driving analysis server 220. The driving analysis module 221 may use the vehicle operation data received from the vehicle operation computer system 225 and/or additional image data, video data, and/or object proximity data to perform driving event analyses for vehicles 210. The driver score calculation module 222 may use the results of the driving event analysis performed by module 221 to calculate or adjust a driver score for a driver of a vehicle 210 based on specific driving events. Further descriptions and examples of the algorithms, functions, and analyses that may be executed by the driving analysis server 220 are described below in reference to FIGS. 3-8.

To perform driving event analyses and driver score calculations, the driving analysis server 220 may initiate communication with and/or retrieve data from one or more mobile devices, one or more vehicles 210, vehicle operation computer systems 225, and additional computer systems 231-234 storing data that may be relevant to the driving event analyses and driver score calculations. For example, one or more traffic data storage systems 231, such as traffic databases, may store data corresponding to the amount of traffic and certain traffic characteristics (e.g., amount of traffic, average driving speed, traffic speed distribution, and numbers and types of accidents, etc.) at various specific locations and times. Traffic data storage systems 231 also may store image and video data recorded by traffic cameras various specific locations and times. One or more weather data storage systems 232, such as weather databases, may store weather data (e.g., rain, snow, sleet, hail, temperature, wind, road conditions, visibility, etc.) at different locations and different times. One or more additional driving databases/systems 233 may store additional driving data from one or more different data sources or providers which may be relevant to the driving event analyses and/or driver score calculations performed by the driving analysis server 220. Additional driving databases/systems 233 may store data regarding events such as road hazards and traffic accidents, downed trees, power outages, road construction zones, school zones, and natural disasters that may affect the driving event analyses and/or driver score calculations performed by the driving analysis server 220. One or more additional infrastructure systems 234 may store sensor data collected from traffic lights, traffic signs (e.g., stop signs), and other traffic structures (e.g., bus stops, train stations, construction sites, other traffic signs, etc.). For instance, various traffic lights and traffic signs may include sensors (e.g., motion sensors, cameras, etc.) that may be used to obtain driving characteristics of a vehicle. As an example, a stop sign may detect how quickly a vehicle is decelerating and whether the vehicle stopped at a specified point. The sensor may then transmit, to a central controller of the infrastructure system 234 via a wide area network (e.g., satellite network, cellular network, etc.), the sensor data along with a time stamp. In some cases, sensor data may be periodically transferred to the central controller. Additionally or alternative, sensor data may be transferred in response to detection of an event (e.g., a vehicle approaching a traffic light or traffic sign). As discussed below in reference to FIGS. 3-8, the driving analysis server 220 may retrieve and use data from databases/systems 231-234 to analyze and evaluate the driving events identified from the driving data of vehicles 210.

Figure 3:
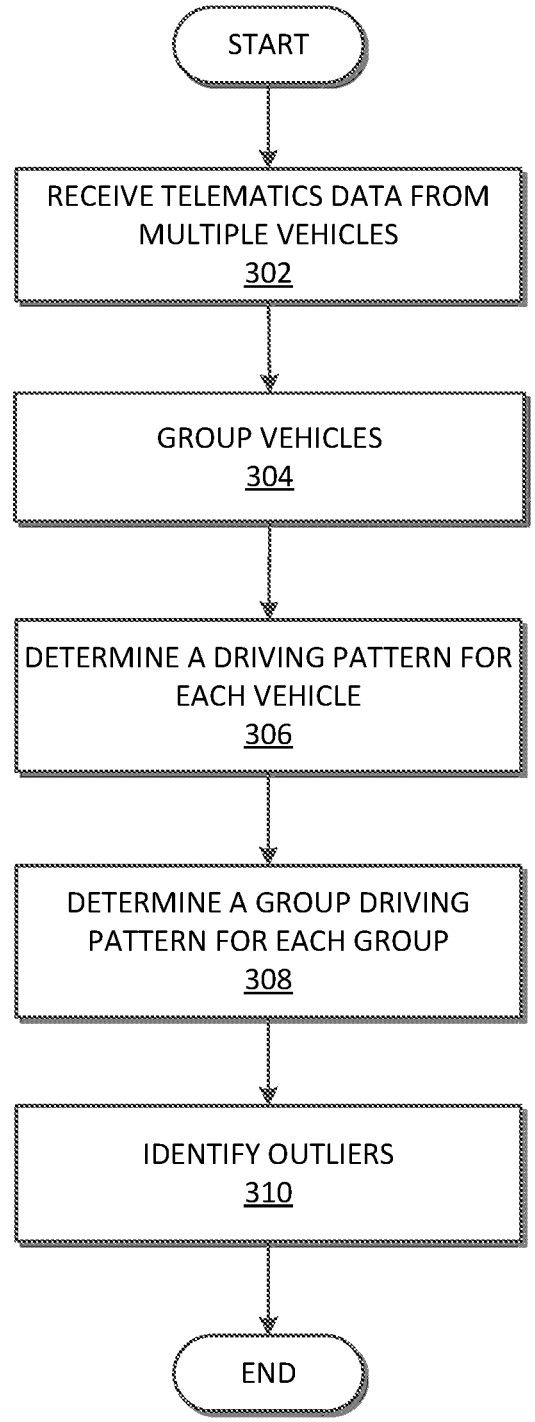
FIG. 3 depicts an illustrative flow diagram for an example method of grouping vehicles and identifying outliers that have a driving pattern substantially different from the group's driving pattern, according to one or more aspect of the disclosure.

FIG. 3 depicts an illustrative flow diagram for an example method of grouping vehicles and identifying outliers that have a driving pattern substantially different from the group's driving pattern, according to one or more aspect of the disclosure. The method of FIG. 3 and/or one or more steps thereof may be performed by a computing device (e.g., driving analysis server 220). The method illustrated in FIG. 3 and/or one or more steps thereof may be partially or fully embodied, for example, in computer-executable instructions that are stored in a computer-readable medium, such as a non-transitory computer-readable memory. In some instances, one or more steps of FIG. 3 may be performed in a different order and/or combined. In some instances, one or more steps of FIG. 3 may be omitted and/or otherwise not performed.

The steps in the example method of FIG. 3 describe a method of identifying outlier drivers who follow a driving pattern substantially different from other drivers under similar circumstances. For instance, some outlier drivers may drive in a more low-risk and safe manner as compared to other drivers under similar circumstances. For instance, some outlier drivers may drive in a more high-risk and unsafe manner as compared to other drivers under similar circumstances. Such determinations (e.g., whether an outlier driver is more or less safe than his or her peers) may be used to adjust a driver score of the outlier driver as will be discussed in further detail below. Additionally, and as will be explained in further detail below, contextual information may explain why the outlier driver is behaving differently from his or her peers, which may also be accounted for in the driver's score.

As shown in FIG. 3, the method may begin at step 302 in which a computing device (e.g., driving analysis server 220) may receive telematics data from one or more (e.g., multiple) vehicles 210a-n. As an example, the telematics data may be received from one or more of the vehicle operation sensors 212, telematics device 216, and/or camera and proximity sensors 214. Devices 212-216 may begin transmitting telematics data in response to the vehicle being turned on, being moved, or some other triggering event defined by an operator driving analysis server 220 and sent to the devices 212-216.

In one or more arrangements, mobile device 218 may receive telematics data of a vehicle from one or more of vehicle's vehicle operation sensors 212, telematics device 216, and camera and proximity sensors 214, and relay that information to driving analysis server 220. Additionally or alternatively, mobile device 218 may generate telematics data using its own processor, GPS component, accelerometer, gyroscope, camera, microphone and other sensor devices of mobile device 218. In some instances, an application (e.g., mobile app) installed on mobile device 218 may detect when it (and, thus, its user or owner) have begun a trip in a moving vehicle and record acceleration, deceleration, lateral movement, geographic location and other telematics data of mobile device 218, which may correlate and/or otherwise represent the telematics data of the vehicle 210 in which mobile device 218 is disposed and/or otherwise located within. Mobile device 218 may detect that a trip has begun in response to determining that mobile device is moving beyond a preset speed (e.g., 20 mph) for a preset duration (e.g., 2 minutes).

In some cases, one or more vehicles might not send its telematics data to driving analysis server 220. For instance, such vehicle's vehicle operations sensors 212, telematics device 216, camera/proximity sensors 214, and mobile device 218 might not send the vehicle's telematics data. In such cases, camera and proximity sensors 214 of a vehicle that are transmitting the telematics data of the vehicle may include images and/or video data of vehicles in its immediate surroundings, which driving analysis server 220 may use to determine the location, acceleration, deceleration, and other telematics data of those vehicles in the image and/or video data. As a result, driving analysis server 220 may receive telematics data from some vehicles and derive telematics data of vehicles that do not send their telematics data.

In certain embodiments, telematics devices 216, vehicle operation systems 225, mobile devices 218 and other data sources may transmit telematics data (e.g., vehicle operation data) for a vehicle 210 to the driving analysis server 220 in real-time (or near real-time). The driving analysis server 220 may be configured to receive the vehicle operation data, and then perform real-time (or near real-time) driving analyses and driver score calculations for the vehicle 210. In other embodiments, vehicle operation data might not be transmitted in real-time but may be sent periodically (e.g., hourly, daily, weekly, etc.) by telematics devices 216 or vehicle operation systems 225. Periodic transmissions of vehicle operation data may include data for a single vehicle or single driver, or for multiple vehicles or drivers. The driving analysis server 220 may be configured to receive the periodic transmissions, and then to perform the steps of FIGS. 3-5 and 8.

Telematics data may include, for example, sensor data, geographic location data, linear acceleration data, linear deceleration data, linear velocity, lateral orientation, angular rotational velocity, angular rotational acceleration, orientation relative to Earth's magnetic field, image data, video data, audio data, route, street name, navigational directions, status of components of the vehicle (e.g., brake activated), or any other data describing the behavior of the vehicle discussed herein.

Additionally, driving analysis server 220 may receive telematics data of vehicle from one or more infrastructure systems. For example, traffic structures such as traffic lights and traffic signs (e.g., stop signs) may include one or more sensors for capturing telematics data of a vehicle when the vehicle is within a preset distance of the traffic structure. The sensors may include motions sensors, cameras, and other sensors described herein. The sensors may transmit, to the driving analysis server 220, the telematics data along with timestamp at which the data was collected, the location of the traffic structure, a status of the traffic light (e.g., whether the light was green, yellow or red), and/or an identifier of the traffic structure.

Using the telematics data captured from the sensors, the driving analysis server 220 may be able to determine the speed of a vehicle, the rate at which the vehicle is accelerating or decelerating (e.g., whether the vehicle hard-braked in response to a yellow light), changes in direction of the vehicle (e.g., whether the vehicle swerved), and other driving events described herein. In addition, by collecting telematics from multiple vehicles in close proximity to one another, the driving analysis server 220 may determine the effects of actions by one vehicle on another vehicle. As an example, the driving analysis server 220 may determine that a first vehicle swerved in front of a second vehicle causing the second vehicle to hard-brake. The driving analysis server 220 may determine whether another environmental circumstance caused a vehicle to perform an unsafe driving event. As an example, the driving analysis server 220 may determine that a vehicle hard-braked when the traffic light was yellow. As another example, the driving analysis server 220 may determine that a vehicle reduced speed but did not stop for a stop sign. As will be discussed more fully below, each determination may result in an increased or decreased driver score for the driver of the vehicle.

In step 304, a computing device (e.g., driving analysis server 220) may group vehicles into one or more groups based on their telematics data. In one or more arrangements, vehicles 210a-n may be grouped based on their geographic location (e.g., to capture vehicles travelling along a same route). The operator of driving analysis server 220 may define a maximum distance in which each vehicle of a group may be separated from each other vehicle of a group without being considered as no longer part of the group. As an example, the maximum distance may be 50 feet (or 15.24 meters) or some other distance. In this example, a vehicle that is a distance greater than 50 feet from another vehicle considered in the group would no longer be considered part of the group. Driving analysis server 220 may use telematics data (e.g., geographic location, video data, etc.) of the vehicles to determine a distance between the vehicles.

For instance, FIG. 6 depicts a top view of multiple vehicles 210a-e traversing a street 602, according to one or more aspects of the disclosure. Since each of vehicles 210a-c may be within 50 feet from each other, driving analysis server 220 may group vehicles 210a-c into one group (e.g., group 604a). Vehicles 210d-e might not be grouped into group 604a since they are each located at a distance greater than 50 feet away from at least one of vehicles 210a-c. However, driving analysis server 220 may group vehicles 210d-e into another group (e.g., group 604b) since they are within 50 feet from one another. An operator (or an external application via API communicating with driving analysis server 220) may adjust the maximum distance to increase or reduce the granularity (e.g., size) of the groups.

Additionally or alternatively, in one or more arrangements, vehicles 210a-n may be grouped based on routes traversed by vehicles 210a-n. A route may include one or more streets traversed in a particular sequential order by a vehicle. As an example, a route may include a vehicle's traversal of a particular segment of street A in a particular direction, followed by traversal of a particular segment of street B in a particular direction, and so on. A segment of a street may be specified by two geographic locations (e.g., two sets of GPS longitude and latitude coordinates), by two end markers (e.g., two bounding cross-streets that intersect the street), etc. Driving analysis server 220 may identify various routes traversed by vehicles 210a-n and group vehicles that traversed the same route. In some instances, the grouping may also be specific to a time of day or date in which the vehicles 210a-n traversed the various routes. In other instances, the groupings might not be specific to a time of day or date in which the vehicles 210a-n traversed the routes. As an example, two vehicles that traversed the same route at different times of day or on different dates may still be grouped together.

In some embodiments, vehicles in a particular group may be further grouped into one or more levels of sub-groups based on their telematics data. As an example, one group may be formed based on each vehicle traversing the same route. Driving analysis server 220 may group the vehicles of the group into one or more subgroups based on a time of day or date the vehicles traversed the route. Driving analysis server 220 may then group the vehicles of each subgroup into another level of subgroups based on the vehicles being within a maximum distance from each other in a similar manner as discussed above in connection with FIG. 6.

In step 306, a computing device (e.g., driving analysis server 220) may determine a driving pattern for each of the vehicles 210a-n based on their telematics data and store the driving patterns in a database. A vehicle's driving pattern may be based on, for example, vehicle state or operation data (e.g., linear acceleration data, linear deceleration data, linear velocity, lateral orientation, angular rotational velocity, angular rotational acceleration, orientation relative to Earth's magnetic field, image data, video data, audio data, navigational directions (e.g., turn left, turn right), status of components of the vehicle (e.g., brake activated, etc.) and the corresponding geographic locations, times and/or sequential order at which the vehicle was in the particular state or performed a particular operation.

As an example, a pattern may be in the form of a vector. A vector may include multiple elements in a specific sequence. The position of each element in the vector may represent different geographic locations and/or times at which the vehicle traversed various points of the route. As an example, the second element in each vector may correspond to when the respective vehicle traversed geographic location B of the route. The positions in the vector define a sequential order of performed driving operations or states. In some instances, an operator may select various points of a route on a geographical map to assign to different positions of the vector. Each element may represent a driving event or state (e.g., any driving event or state discussed herein). A value of each element may represent the type of driving event or state and/or its level of risk or safety. For instance, values 1-5 may represent a brake event with 1 being a very soft-braking event and 5 being a very hard-braking event. For instance, values 5-10 may represent an acceleration event with a value of 6 being a gradual acceleration and 10 being a rapid acceleration. Driving analysis server 220 may store a legend of what each value of an element represents, which may be in the form of a table. For instance, the legend may indicate that a value of 1 represents a soft-brake event.

As another example, each pattern may be in the form of a directed graph. Driving analysis server 220 may, for each of the vehicles 210a-n, correlate geographic location with one or more other telematics data (e.g., acceleration data, deceleration data, angular rotational velocity, etc.) and, based on the determined correlations, generate a pattern of state transitions (e.g., soft-brake, accelerate, constant velocity, left turn, right turn, hard-brake, lane change, swerve, etc.). The pattern of state transitions may be in the form of a directed behavioral graph including multiple objects (e.g., state) interconnected by multiple links (e.g., directed edges). The objects may represent a particular driving event or state (e.g., acceleration, turn left, turn right, soft-brake, hard-brake, lane-change, swerve, etc.) and the links may be representative of a temporal or geographic relations between the objects.

In step 308, a computing device (e.g., driving analysis server 220) may determine a group driving pattern for each of the groups and/or sub-groups and store the patterns in a database. For instance, driving analysis server 220 may, for each group, compare each group member's driving pattern with each other group member's driving pattern to determine a normalized driving pattern representative of the group's driving behavior. Similarly, driving analysis server 220 may, for each sub-group, compare each sub-group member's driving pattern with each other sub-group member's driving pattern to determine a normalized driving pattern representative of the sub-group's driving behavior.

Following the vectors example, driving analysis server 220 may generate a vector that is representative of a group by averaging each of the vectors associated with vehicles in that group. For instance, driving analysis server 220 may average the first element in each vector and set the result as the value of the first element in the group's or sub-group's vector. Similarly, driving analysis server 220 may average the second element in each vector and set the result as the value of the second element in the group's or sub-group's vector.

Following the directed graph example, driving analysis server 220 may infer and/or otherwise generate a normalized directed graph based on the directed graph for each vehicle in a group or sub-group. In such instances, driving analysis server 220 may select objects and links most frequently used at a particular position in each directed graph to be the objects and links of the normalized graph.

In step 310, a computing device (e.g., driving analysis server 220) may identify outlier vehicles (also referred to herein as outlier drivers or simply outliers). For each member (e.g., vehicle/driver) of a group or sub-group, driving analysis server 220 may compare the vehicle's driving pattern with its corresponding group's or sub-group's group driving pattern to determine whether the vehicle's driving pattern is similar or dissimilar from the group's or sub-group's group driving pattern. If the vehicle's driving pattern is dissimilar (e.g., different) from its group's or sub-group's group driving pattern beyond a particular measure, the vehicle may be identified as an outlier.

Following the vector example, driving analysis server 220 may compare a vehicle's vector with a group's or sub-group's vector. In one instance, driving analysis server 220 may compute a vector score for a vector based on the values of each element of the vector. For example, driving analysis server 220 may aggregate each of the values in the vector. The driving analysis server 220 may then compare the vector score of a vehicle with the vector score of its group or sub-group. If the resulting difference between the two vector scores is greater than or equal to a maximum difference threshold (or, alternatively, less than a minimum similar threshold), the vehicle may be identified as an outlier. If not, the vehicle might not be identified as an outlier.

Following the directed graph example, driving analysis server 220 may compare a vehicle's directed graph with a group's or sub-group's directed graph. In one instance, driving analysis server 220 may determine the percentage of matching object and/or edge sequences. If the percentage of matching objects and/or edge sequences is less than a minimum similarity threshold percentage, the vehicle may be identified as an outlier. If the percentage of matching objects and/or edge sequences is less than the minimum similarity threshold percentage, the vehicle might not be identified as an outlier. Additionally or alternatively, in another instance, driving analysis server 220 may determine whether an object type (e.g., a brake event) of a particular or operator-specified object in the vehicle's directed graph matches the object type of a corresponding object in the group's or sub-group's directed graph.

Figure 4:
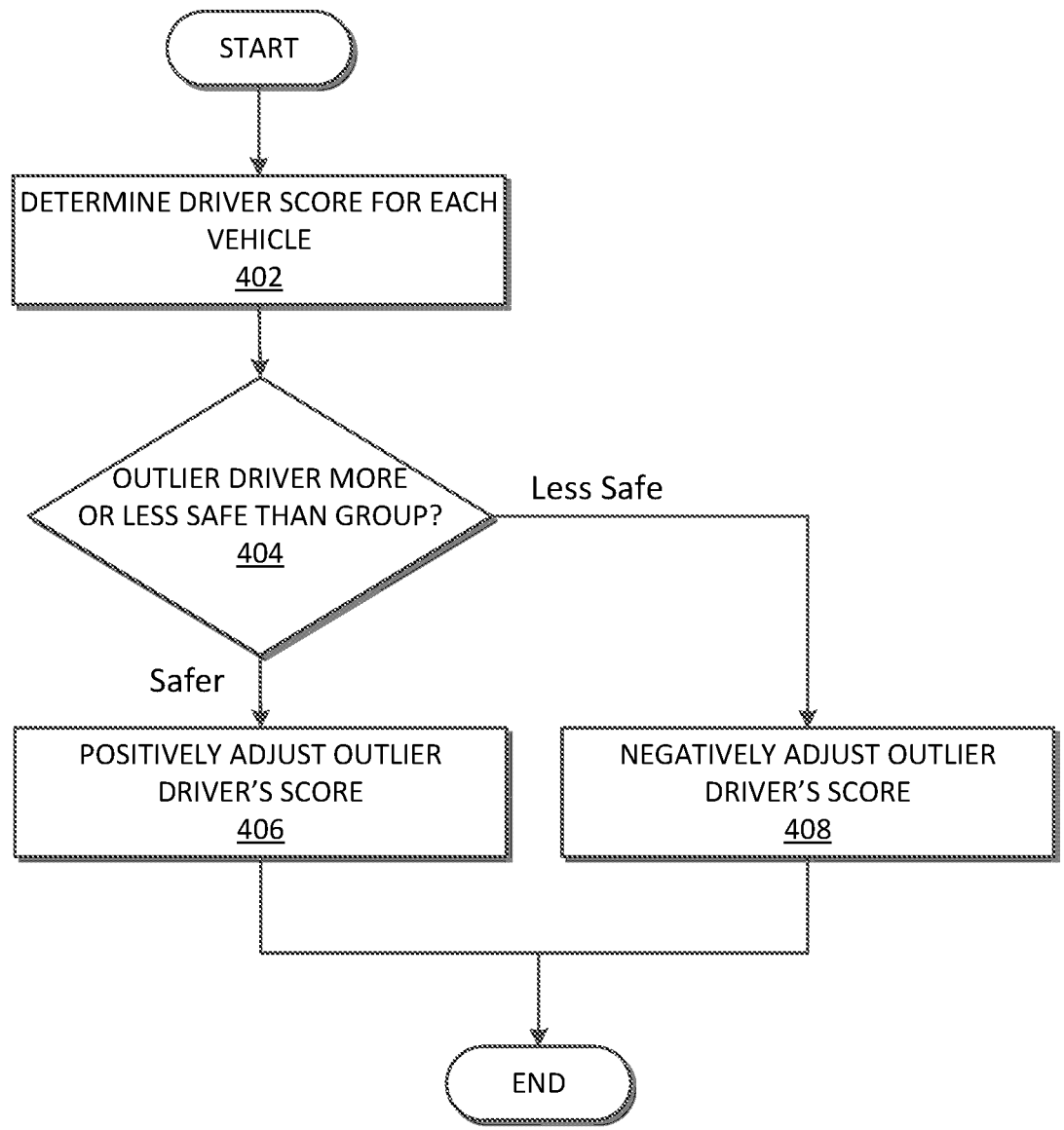
FIG. 4 depicts an illustrative flow diagram for an example method of adjusting a driving score of an identified outlier driver that has a driving pattern substantially different from the group's driving pattern, according to one or more aspect of the disclosure.

FIG. 4 depicts an illustrative flow diagram for an example method of adjusting a driving score of an identified outlier driver that has a driving pattern sufficiently different from the group's driving pattern, according to one or more aspect of the disclosure. The method of FIG. 4 and/or one or more steps thereof may be performed by a computing device (e.g., driving analysis server 220). The method illustrated in FIG. 4 and/or one or more steps thereof may be partially or fully embodied, for example, in computer-executable instructions that are stored in a computer-readable medium, such as a non-transitory computer-readable memory. In some instances, one or more steps of FIG. 4 may be performed in a different order and/or combined. In some instances, one or more steps of FIG. 4 may be omitted and/or otherwise not performed.

In some instances, prior to performing the steps of FIG. 4, one or more steps of FIG. 3 may be performed. For example, steps 302-310 may have already been performed so that the computing device has received the telematics data of the vehicles and identified outliers.

As shown in FIG. 4, the method may begin at step 402 in which a computing device (e.g., driving analysis server 220) may determine a driver score for each of the vehicles 210a-n based on the telematics data of the vehicles. Step 402 may be performed at any point in time after the telematics data of the vehicle has been received. For example, step 402 may be performed prior to grouping the vehicles.

A driver score may be determined based on his or her vehicle's telematics data. In some instances, a person assigned to the vehicle may be associated with the driver score even if another person drives the vehicle. In other instances, the driver of the vehicle may be specifically identified so that the driver score is associated with the person who actually drove the vehicle. Driving analysis server 220 may identify high-risk or unsafe events performed by the vehicle from the telematics data, for example, by comparing values of the telematics data with preset dynamic thresholds, or combinations of thresholds. The preset thresholds may be dynamically adjusted based on weather and road conditions. For instance, the thresholds may have different values for dry weather conditions, rain, snow, sleet, fog, daytime, night time, road construction, and/or combinations thereof. As an example, a maximum speed threshold used in determining an excessive speeding event may be 50 miles per hour on a particular road during the daytime and when the road is dry. However, the maximum speed threshold may be 30 miles per hour on the particular road during the night time and when the road is wet (e.g., when it is raining).

The driver score may account for numerous other high-risk or unsafe driving events, which may negatively affect (e.g., reduce) the driver score. As an example, an excessive speeding event may be a high-risk or unsafe driving event in which the vehicle's speed or velocity is greater than a maximum speed threshold (e.g., speed limit of road being traversed by the vehicle). As another example, a hard-braking event may be a high-risk or unsafe driving event in which the vehicle decelerated at a rate greater than a maximum threshold deceleration rate. As yet another example, a hard-acceleration event may be a high-risk or unsafe driving event in which the vehicle accelerated at a rate greater than a maximum threshold acceleration rate. As still yet another example, a hard-turning event may be a high-risk or unsafe driving event in which the vehicle traveled at an angular rotational velocity greater than a maximum threshold angular rotational velocity. As another example, a swerving event may be a high-risk or unsafe driving event in which the vehicle performed two turns in quick succession. A tailgating event may be a high-risk or unsafe driving event in which the vehicle follows another vehicle too closely (e.g., is within a distance that is less than minimum distance from the other vehicle). A cutoff event may be a high-risk and unsafe driving event in which the vehicle changes lanes that would have resulted in a collision with another vehicle but for an evasive maneuver of the other vehicle.

At step 404, a computing device (e.g., driving analysis server 220) may, after one or more outliers have been identified in step 310, determine whether an outlier driver was more or less safe that his or her group or sub-group. Driving analysis server 220 may determine a total number of high-risk or unsafe driving events performed by the outlier and an average number of high-risk or unsafe driving events by the group or sub-group. If the outlier has fewer high-risk or unsafe driving events than the group average, then the outlier is driving safer than the other members of the group on average and the driving analysis server 220 may, in step 406, positively adjust (e.g., increase) the driver score of the outlier. Otherwise, if the outlier has a greater number of high-risk or unsafe driving events than the group average, then the outlier is driving less safe than the other members of the group on average and the driving analysis server 220 may, in step 408, negatively adjust (e.g., decrease) the driver score of the outlier.

Figure 5:
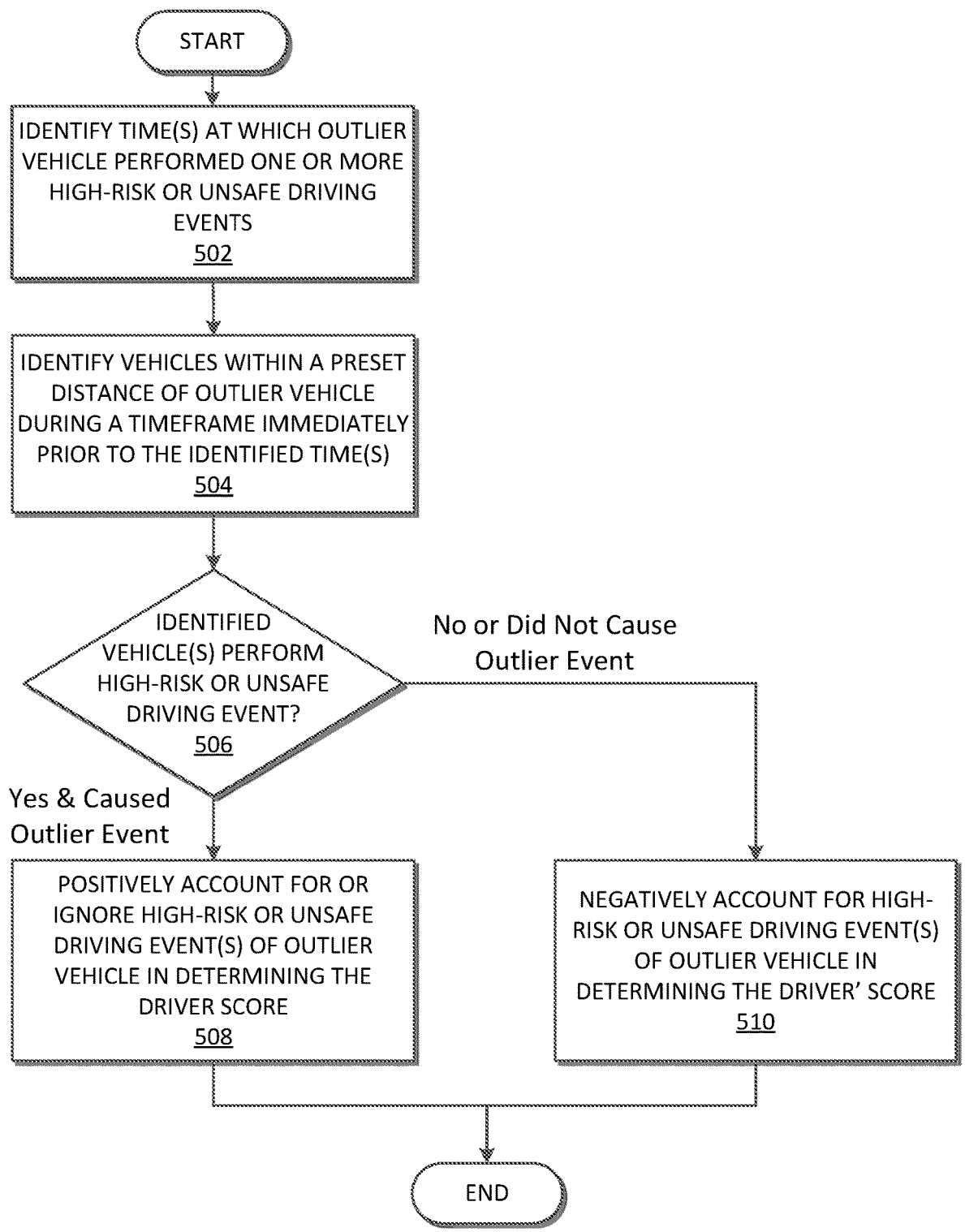
FIG. 5 depicts an illustrative flow diagram for an example method of accounting for less safe driving behavior of other vehicles in determining a driver score for an outlier, according to one or more aspect of the disclosure.

FIG. 5 depicts an illustrative flow diagram for an example method of accounting for less safe driving behavior of other vehicles in determining a driver score for an outlier, according to one or more aspect of the disclosure. In some cases, an outlier may have performed a high-risk or unsafe driving event in order to avoid an accident with another vehicle that has suddenly swerved into the path of the outlier. In such cases, the high-risk or unsafe driving event (e.g., hard-braking) performed by the outlier might be ignored in computing its driver score. The method of FIG. 5 and/or one or more steps thereof may be performed by a computing device (e.g., driving analysis server 220). The method illustrated in FIG. 5 and/or one or more steps thereof may be partially or fully embodied, for example, in computer-executable instructions that are stored in a computer-readable medium, such as a non-transitory computer-readable memory. In some instances, one or more steps of FIG. 5 may be performed in a different order and/or combined. In some instances, one or more steps of FIG. 5 may be omitted and/or otherwise not performed.

In some instances, prior to performing the steps of FIG. 5, one or more steps of FIG. 3 or 4 may be performed. For example, steps 302-310 and/or steps 402-408 may have already been performed so that the computing device has received the telematics data of the vehicles and identified outliers. As discussed above, telematics data for the vehicles may also be received from sensors (e.g., motion sensors, cameras, etc.) attached to traffic structures such as traffic lights and traffic signs (e.g., stop signs).

As shown in FIG. 5, the method may begin at step 502 in which a computing device (e.g., driving analysis server 220) may identify, after one or more outliers have been identified in step 310, times at which the outlier performed the one or more (e.g., each) high-risk or unsafe driving events using the outlier's telematics data. The telematics data received from each of the vehicles 210a-n may include a timestamp of when each sensed and/or otherwise determined data item (e.g., a braking event) of the telematics data occurred. The timestamp may include fields for year, month, day, hour, minutes, seconds, sub-seconds, indications of before noon or after noon (e.g., am or pm), and/or time-zone. For each identified high-risk or unsafe driving event, driving analysis server 220 may identify the event's associated timestamp from the telematics data. As an example, a hard-braking event may be associated with (e.g., occurred at) a timestamp of Jun. 16, 2015 at 12:31 pm and 5 second and 8 tenths of a second, eastern standard time.

In step 504, a computing device (e.g., driving analysis server 220) may identify vehicles within the immediate vicinity (e.g., within a preset distance) of the outlier during a timeframe immediately prior to each of the times identified in step 504, so that the computing device may determine whether one or more of these vehicles quickly and unexpectedly moved into the path of the outlier. If so, then an occurrence of sudden swerving or braking event by the outlier may indicate that its driver was paying proper attention and reacted appropriately to the situation and might not be penalized for performing the high-risk and unsafe driving event.

The preset distance may be any operator specified distance for use in determining which vehicles are in the immediate vicinity of the outlier. The specified distance may be determined by an operator, insurance provider, vehicle manufacturer, or the like. The preset distance may be dynamically adjusted based on the speed or velocity of one or more of the vehicles. As an example, the preset distance may be 10 feet when the vehicles are moving less than 20 miles per hour. However, the preset distance may be 30 feet when the vehicles are moving more than 20 miles per hours. For instance, the driving analysis server 220 may use telematics data from a camera attached to a traffic structure to determine whether a vehicle is within the immediate vicinity of an outlier. For instance, a di stance between two vehicles may be determined based on geographic location information (e.g., GPS coordinates) of the vehicles.

The timeframe may be of any specified duration with its end time being the timestamp of a high-risk or unsafe driving event. The specified duration may be determined by an operator, insurance provider, vehicle manufacturer, or the like. As an example, if a duration of a timeframe is preset to be 2 seconds, then, in the above hard-braking event example, the timeframe may begin at time Jun. 16, 2015 at 12:31 pm and 3 second and 8 tenths of a second, eastern standard time and end at time Jun. 16, 2015 at 12:31 pm and 5 second and 8 tenths of a second, eastern standard time. In some embodiments, different types of high-risk or unsafe driving events (e.g., hard-braking events, swerving events, etc.) may be associated with timeframes having different durations. As an example, the duration of a timeframe associated with a hard-breaking event may be 2 seconds as discussed above and the duration of a timeframe associated with a swerving event may be 1.5 seconds.

FIG. 7 depicts an illustrative top view of multiple vehicles 710*a*-*d* traversing a street or road 702, according to one or more aspects of the disclosure. In this example, driving analysis server 220 may have determined that vehicle 710*a* is an outlier and that vehicle 710*a* performed a hard-braking event at time Jun. 16, 2015 at 12:31 pm and 5 second and 8 tenths of a second, eastern standard time. If the duration of the time is set to be 3 seconds then the timeframe would start at time Jun. 16, 2015 at 12:31 pm and 2 second and 8 tenths of a second, eastern standard time and end at time Jun. 16, 2015 at 12:31 pm and 5 second and 8 tenths of a second, eastern standard time.

In this example, driving analysis server 220 may use the telematics data (e.g., velocity data, geographic location, etc.) of vehicles 710*a*-*d*, which may have been received from the vehicles 710, mobile devices, and/or sensors (e.g., cameras) attached to traffic structures 704 (e.g., traffic lights, stop signs, etc.), to determine, during the timeframe, that the average speed of the vehicles is 45 miles per hour, that vehicles 710*a*-*b* are separated by a distance 10 feet, that vehicles 710*a,c* are separated by a distance of 20 feet, that vehicles 710*a,d* are separated by a distance of 60 feet, etc. Driving analysis server 220 may determine that the preset distance is 30 feet based on the average speed of the vehicles 710*a*-*d* and may also determine that vehicles 710*b*-*c* are each within with a preset distance of 30 feet during the timeframe. Driving analysis server 220 may also determine that vehicle 710*d* is not within the preset of distance of 30 feet. In instances where the grouping of vehicles is based on proximity, the vehicles in the vicinity of an outlier may be other members of the group.

In step 506, a computing device (e.g., driving analysis server 220) may determine whether the vehicles identified as being within the preset distance during the timeframe (e.g., vehicles 210*b*-*c*) performed a high-risk or unsafe driving event during the timeframe that caused the outlier to perform a high-risk or unsafe driving event. Referring to the example illustrated in FIG. 7, driving analysis server 220 may determine, using the telematics data from vehicle 710*b* or image/video data from traffic structure 704, that vehicle 710*b* performed a high-risk or unsafe driving event while within the preset distance of vehicle 710*a* during the timeframe. Namely, vehicle 710*b* swerved and cutoff vehicle 710*a* causing vehicle 710*a* to hard-brake in order to avoid an accident.

In step 508, if a computing device (e.g., driving analysis server 220) determines that a vehicle identified in step 504 performed a high-risk or unsafe driving event that caused the outlier to perform its high-risk or unsafe driving event in step 506, then the computing device may positively account for or ignore the outlier's high risk or unsafe driving event in its determination of the driver score for the outlier. Following the above example, if vehicle 710*b* swerved and cutoff vehicle 710*a* causing vehicle 710*a* to hard-brake in order to avoid an accident, then the hard-brake performed by vehicle 710*a* may be positively accounted for or ignored in the determination of the driver score for vehicle 710*a*. In instances where a driver score has already been computed for vehicle 710*a*, driving analysis server 220 may either maintain or positively adjust (e.g., increase) the driver score.

In step 510, if a computing device (e.g., driving analysis server 220) determines that a vehicle identified in step 504 either did not perform a high-risk or unsafe driving event or that a performed high-risk or unsafe driving event did not cause the outlier to perform its high risk or unsafe driving event in step 506, then the computing device may negatively account for outlier's high-risk or unsafe driving event in determining the driver score for the outlier. Referring to and altering the example illustrated in FIG. 7, if vehicle 710*b* did not swerve, then the outlier's hard-brake may be negatively accounted for in the determination of the driver score for vehicle 710*a*. As another example, if vehicle 710*b* did swerve but not into the path of vehicle 710*a*, then driving analysis server 220 may determine that the high-risk or unsafe driving event performed by vehicle 710*b* did not cause vehicle 710*a* to hard-brake and may negatively account for the hard-brake in the determination of the driver score for vehicle 710*a*. In instances where a driver score has already been computed for vehicle 710*a*, driving analysis server 220 may negatively adjust (e.g., decrease) the driver score. In some cases, the cause of the high-risk or unsafe driving event performed by the outlier may be the result of other environmental circumstances. As an example, the driving analysis server 220 may determine, from telematics data of the outlier received from the outlier and from traffic structure 704 (e.g., a traffic light), that the outlier performed a hard-brake in response to the traffic structure 704 displaying a yellow light. In such an instance, the driver's score might not be negatively affected as a result of the hard-brake.

Figure 8:
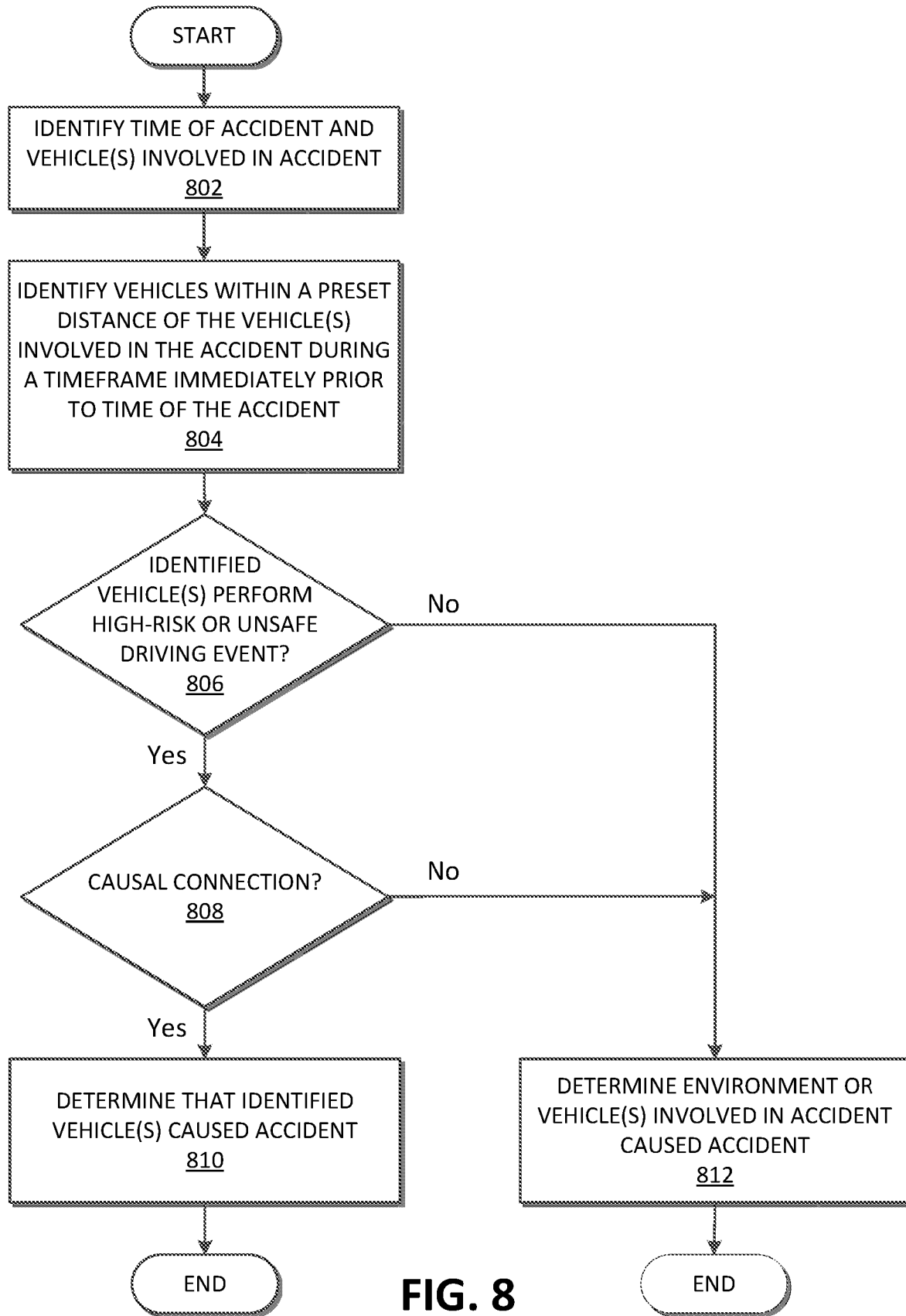
FIG. 8 depicts an illustrative flow diagram for an example method of determining whether a vehicle not involved in an accident caused the accident, according to one or more aspects of the disclosure.

FIG. 8 depicts an illustrative flow diagram for an example method of determining whether a vehicle not involved in an accident caused the accident and/or otherwise is at fault, according to one or more aspects of the disclosure. The method of FIG. 8 and/or one or more steps thereof may be performed by a computing device (e.g., driving analysis server 220). The method illustrated in FIG. 8 and/or one or more steps thereof may be partially or fully embodied, for example, in computer-executable instructions that are stored in a computer-readable medium, such as a non-transitory computer-readable memory. In some instances, one or more steps of FIG. 8 may be performed in a different order and/or combined. In some instances, one or more steps of FIG. 8 may be omitted and/or otherwise not performed.

Prior to performing the steps of FIG. 8, one or more steps of the above FIGS. 3-5 may be performed. For example, steps 302-310 may have already been performed so that the computing device has received the telematics data of the vehicles and identified outliers.

The method may being at step 802 in which a computing device (e.g., driving analysis server 220) may identify a time of an accident and vehicles involved in the accident based on the telematics data of the vehicles 210*a-n*. As an example, a sudden shift in linear or angular acceleration and/or linear or angular velocity of a vehicle may indicate that an accident has occurred. As another example, a sudden shift in linear or rotational acceleration and/or linear or angular velocity of two vehicles substantially simultaneously may also indicate that an accident has occurred. Once the driving analysis server 220 has determined that an accident has occurred, it may identify a time at which the accident occurred from time data (e.g., timestamps) include with the telematics data of the vehicles.

In step 804, a computing device (e.g., driving analysis server 220) may identify vehicles that were not involved in the accident (e.g., did not collide with any object or vehicle) but were within the immediate vicinity (e.g., within a preset distance) of one or more of the vehicles involved in the accident during a timeframe immediately prior to the accident. The preset distance may be any operator specified distance (e.g., 10 feet, 20 feet, etc.). Similarly, the duration of the timeframe may be any operator specified timeframe (e.g., 2 seconds, 5 seconds, etc.) with the end time being the time of the accident. Driving analysis server 220 may identify vehicles within the preset distance during the timeframe based on telematics data received from those vehicles and/or from image/video data received from vehicles involved in the accident. If no vehicles are identified, driving analysis server 220 may determine that no vehicle outside of those involved in the accident may have caused the accident. Additionally, driving analysis server 220 may further determine that either the environment or one of the vehicles involved in the accident caused the accident.

Otherwise, if one or more vehicles were identified, then in step 806, driving analysis server 220 may determine whether the one or more identified vehicles performed a high-risk or unsafe driving event during the timeframe. If not, then in step 812, driving analysis server 220 may determine that the identified vehicle did not cause (or was not at fault for) the accident and that the accident was either caused by the environment or by one of the vehicles involved in the accident. If the identified vehicle did perform a high-risk or unsafe driving event based on an analysis of either its telematics data or image/video data received from another vehicle, then in step 808, the driving analysis server 220 may determine whether the identified vehicle's high-risk or unsafe driving event caused the accident. As an example, if the identified vehicle performed a high-risk or unsafe driving event (e.g., running a red light of a traffic signal) thereby causing a vehicle to swerve and collide with another vehicle or object, driving analysis server 220 may, in step 810, determine that the identified vehicle caused (or was at fault for) the accident. Otherwise, if the identified vehicle's high-risk or unsafe driving event did not cause the vehicle to collide with another vehicle or object, then in step 812, the driving analysis server 220 may determine that the identified vehicle did not cause the accident and either the environment or the vehicles involved in the accident caused the accident.

In one or more embodiments, the driver score and/or adjustments to the driver score may be presented to a driver via a graphical user interface, which may be provided via a web site or a software application (e.g., a mobile app). As an example, driving analysis server 220 may transmit the score to the driver's mobile device 218 or another computing device (e.g., an onboard computing device of a vehicle, personal computer, laptop, tablet, etc.) for display.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

The invention claimed is:

1. A method comprising:
receiving telematics data from two or more vehicles;
determining a time of an accident based on the telematics data received from the two or more vehicles;
determining, from the two or more vehicles, a vehicle that was within a preset distance of the accident;
determining whether the vehicle performed a high-risk driving event based on the telematics data compared with at least a threshold during a timeframe prior to the time of the accident;
responsive to determining that the vehicle performed the high-risk driving event during the timeframe prior to the accident, determining whether the high-risk driving event caused the accident;
negatively adjust, based on the determination the high-risk driving event caused the accident, a driver score of the vehicle, wherein the driver score is an indication of a driving pattern of the vehicle compared to a normalized group driving pattern representative of driving behavior of the two or more vehicles;
positively adjust or maintain, based on the determination the high-risk driving event did not cause the accident, a driver score of the vehicle; and
automatically present the driver score as (i) an audio output via one or more speakers, (ii) a textual output, audiovisual output, graphical output, or a combination thereof via a video display device, or (iii) a combination thereof.

2. The method of claim 1, further comprising:
determining that the accident occurred based on a shift in linear or rotational acceleration of two vehicles of the two or more vehicles.

3. The method of claim 1, further comprising:
determining that the accident occurred based on a shift in linear or angular velocity of two vehicles of the two or more vehicles.

4. The method of claim 1, wherein an end time of the timeframe is the time of the accident.

5. The method of claim 1, wherein the determining the vehicle that was within the preset distance of the accident is performed based on the telematics data received from the two or more vehicles.

6. The method of claim 1, further comprises determining the vehicle was not involved in the accident by determining that the vehicle did not collide with any object or vehicle.

7. The method of claim 1, wherein the vehicle is identified from image/video data received from a second vehicle involved in the accident.

8. A non-transitory computer readable medium storing instructions that, executed by a computing device, cause the computing device to:
receive telematics data from two or more vehicles;
determine a time of an accident based on the telematics data received from the two or more vehicles;
determine, from the two or more vehicles, a vehicle that was within a preset distance of the accident;

determine whether the vehicle performed a high-risk driving event based on the telematics data compared with at least a threshold during a timeframe prior to the time of the accident;

responsive to determining that the vehicle performed the high-risk driving event during the timeframe prior to the accident, determining whether the high-risk driving event caused the accident;

negatively adjust, based on the determination the high-risk driving event caused the accident, a driver score of the vehicle, wherein the driver score is an indication of a driving pattern of the vehicle compared to a normalized group driving pattern representative of driving behavior of the two or more vehicles;

positively adjust or maintain, based on the determination the high-risk driving event did not cause the accident, a driver score of the vehicle; and automatically present the adjusted driver score as (i) an audio output via one or more speakers, (ii) a textual output, audiovisual output, graphical output, or a combination thereof via a video display device, or (iii) a combination thereof.

9. The non-transitory computer readable medium of claim 8, storing instructions that, executed by a computing device, cause the computing device to:
determine that the accident occurred based on a shift in linear or rotational acceleration of two vehicles of the two or more vehicles.

10. The non-transitory computer readable medium of claim 8, storing instructions that, executed by a computing device, cause the computing device to:
determine that the accident occurred based on a shift in linear or angular velocity of two vehicles of the two or more vehicles.

11. The non-transitory computer readable medium of claim 8, wherein an end time of the timeframe is the time of the accident.

12. The non-transitory computer readable medium of claim 8, wherein the determining that the vehicle that was within the preset distance of the accident is performed based on the telematics data received from the two or more vehicles.

13. The non-transitory computer readable medium of claim 8, further comprises determining the vehicle that was not involved in the accident by determining that the vehicle did not collide with any object or vehicle.

14. The non-transitory computer readable medium of claim 8, wherein the vehicle is identified from image/video data received from a second vehicle involved in the accident.

15. An apparatus comprising:
one or more processors; and
memory storing instructions that, executed by the one or more processors, cause the apparatus to:
receive telematics data from two or more vehicles;
determine a time of an accident based on the telematics data received from the two or more vehicles;
determine, from the two or more vehicles, a vehicle that was within a preset distance of the accident;
determine whether the vehicle performed a high-risk driving event based on the telematics data compared with at least a threshold during a timeframe prior to the time of the accident;
responsive to determining that the vehicle performed the high-risk driving event during the timeframe prior to the accident, determining whether the high-risk driving event caused the accident;
negatively adjust, based on the determination the high-risk driving event caused the accident, a driver score of the vehicle, wherein the driver score is an indication of a driving pattern of the vehicle compared to a normalized group driving pattern representative of driving behavior of the two or more vehicles;
positively adjust or maintain, based on the determination the high-risk driving event did not cause the accident, a driver score of the vehicle; and
automatically present the adjusted driver score as (i) an audio output via one or more speakers, (ii) a textual output, audiovisual output, graphical output, or a combination thereof via a video display device, or (iii) a combination thereof.

16. The apparatus of claim 15, the memory storing instructions that, executed by the one or more processors, cause the apparatus to:
determine that the accident occurred based on a shift in linear or rotational acceleration of two vehicles of the two or more vehicles.

17. The apparatus of claim 15, the memory storing instructions that, executed by the one or more processors, cause the apparatus to:
determine that the accident occurred based on a shift in linear or angular velocity of two vehicles of the two or more vehicles.

18. The apparatus of claim 15, wherein an end time of the timeframe is the time of the accident.

19. The apparatus of claim 15, wherein the determining the vehicle that was within the preset distance of the accident is performed based on the telematics data received from the two or more vehicles.

20. The apparatus of claim 15, further comprises determining the vehicle that was not involved in the accident by determining that the vehicle did not collide with any object or vehicle.

* * * * *